Aug. 31, 1943.  E. A. JONES  2,328,279
AUTOMATIC CONTROL MEANS FOR HEATING DEVICES
Filed May 25, 1940  4 Sheets-Sheet 1

INVENTOR.
EDWIN A. JONES
BY
Arthur R. Woolfork
ATTORNEY.

Aug. 31, 1943.  E. A. JONES  2,328,279
AUTOMATIC CONTROL MEANS FOR HEATING DEVICES
Filed May 25, 1940  4 Sheets-Sheet 2

INVENTOR.
EDWIN A. JONES
BY
ATTORNEY.

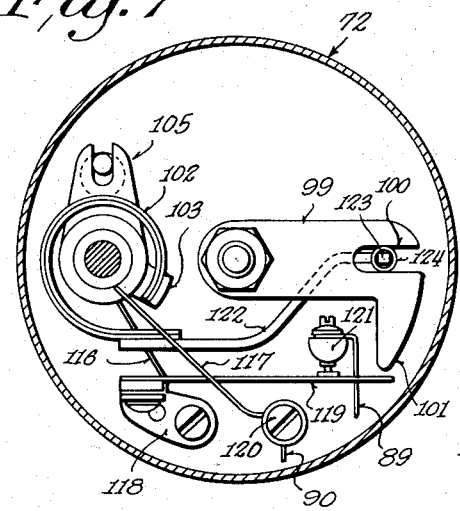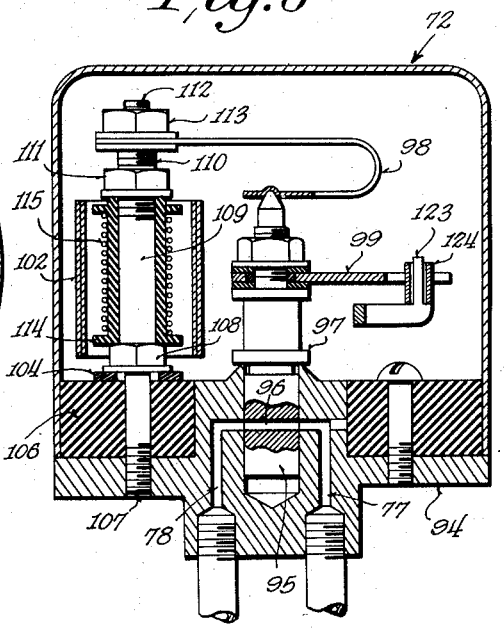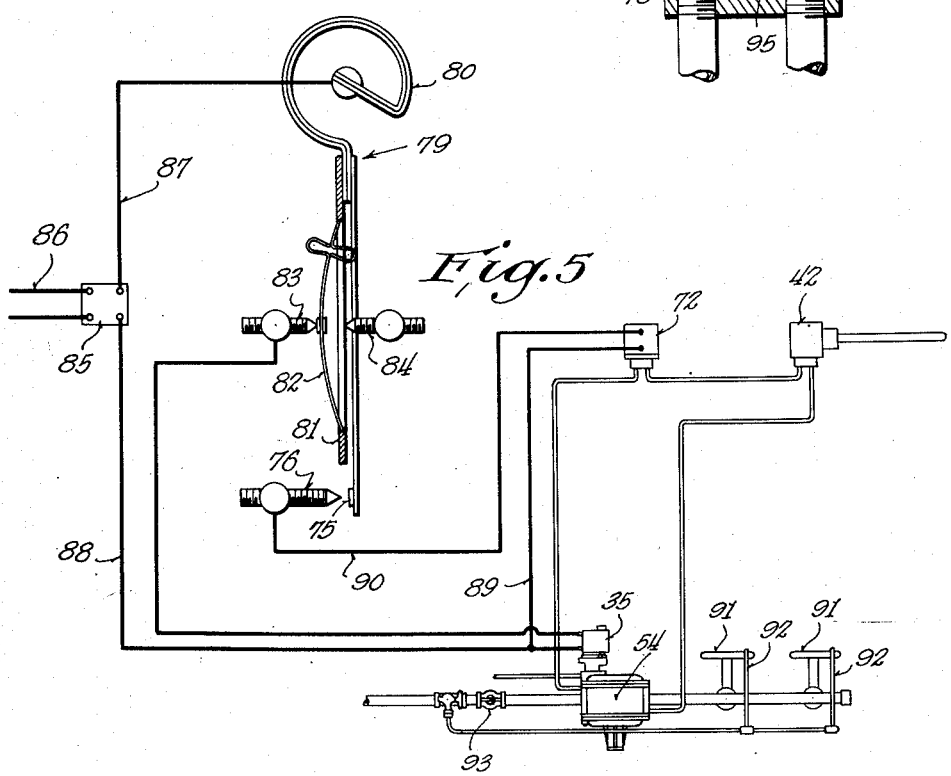

Patented Aug. 31, 1943

2,328,279

UNITED STATES PATENT OFFICE 2,328,279

AUTOMATIC CONTROL MEANS FOR HEATING DEVICES

Edwin A. Jones, Shorewood, Wis.

Application May 25, 1940, Serial No. 337,134

13 Claims. (Cl. 236—80)

This invention relates to a modulating control system and to automatic control means for a heating device.

This invention is designed to provide a system and automatic modulating control means which are so arranged that automatic control of a gas burner or other heating means for a furnace, boiler, or industrial heating equipment is provided; and which is so constructed that modulation of the fuel flow or of one ingredient of the combustible mixture is automatically obtained and a final cut-off is provided, the relation of the modulating valve and on and off valve being such that a full or adequate fuel flow is always initially obtained to preclude flashback during ignition, the modulating control always bringing the fuel flow to the selected condition for which the device is set or to an artificial condition produced by condition responsive means.

More specificaly objects of this invention are to provide a main on and off valve and a modulating valve which are automatically related and which, in the preferred forms, provide for a full opening of the modulating valve upon closure of the main on and off valve and which provides for the supplying of fuel at a pressure which does not exceed a predetermined maximum regulated pressure upon opening of the main valve and which also provides a modulating control which controls the fuel flow in accordance with the demands of the system.

Further objects are to provide a unitary structure in which both the main on and off valve and the modulating valve are provided, in which this single unitary structure may be handled, installed, or adjusted as a unitary device, which is compact, which is simple to manufacture, and which has a very small number of parts.

In certain forms of this invention, further objects are to provide a simple unitary structure embodying a single pressure motor, such, for example, as a diaphragm, and a main on and off valve and modulating valve directly connected to and operated from this pressure motor and accomplishing both features of complete shut off and modulation.

Further objects are to provide a construction which has all of the features hereinabove enumerated and which in addition automatically completely cuts off when the pressure in the supply mains falls below a predetermined value.

Further objects are to provide a combined modulating regulator and cut-off device in which the device may be manually adjusted to provide any desired minimum flow and any desired regulated pressure at which an ingredient of a combustible mixture is supplied the burner, so that the device automatically maintains the selected pressure when full flow is called for and never modulates below the selected minimum flow but instead provides complete cut off when less than the minimum flow is required.

Further objects are to provide a construction having a main on and off valve and a modulating valve which will not operate erratically even if too large a burner is employed or if too small a main supply pipe or other insufficient supply obtains, but which is so constructed that the modulating regulator automatically adjusts itself to its proper position even though either or both of these exaggerated and undesirable installation conditions may obtain.

In greater detail, objects of this invention are to provide a modulating regulator which has an on and off valve and a modulating valve so related that the modulating valve is on the high pressure side of the line ahead of the on and off valve, and the on and off valve is on the low pressure side of the line behind the modulating valve in reference to the direction of fluid flow, the modulating valve always moving against the fluid pressure as it approaches its seat and the on and off valve always moving with pressure as it moves to closed position, and to provide a fluid pressure motive means for the valves which has a bleed leading to a point between the two valves so that this discharge is automatically changed over from the high side of the line to the low side of the line when the on and off valve opens and is automatically changed back to the high side of the line when the on and off valve closes, without the use of any auxiliary apparatus.

Further objects are to provide a system of control for a heating device in which condition responsive means are provided for controlling the main on and off valve and in which condition responsive means are provided for controlling the modulating valve, the motion of the modulating valve towards restricted position being under the control of one or more condition responsive means one of which may be arranged to adjust the modulating valve in a gradual manner in accordance with a condition in one part of the system, and the other of which may cause the modulating regulator to move towards minimum flow position at repeated intervals in accordance with the needs of the heated medium at another part of the system.

Embodiments of the invention are shown in the accompanying drawings, in which:

Figure 5 is a view, partly diagrammatic, of the system showing the modulating regulator in place.

Figure 6 is a view of a thermally operated control valve which may be used in the system.

Figure 7 is a plan view of the structure shown in Figure 6 with parts sectioned away.

Figures 1, 2:
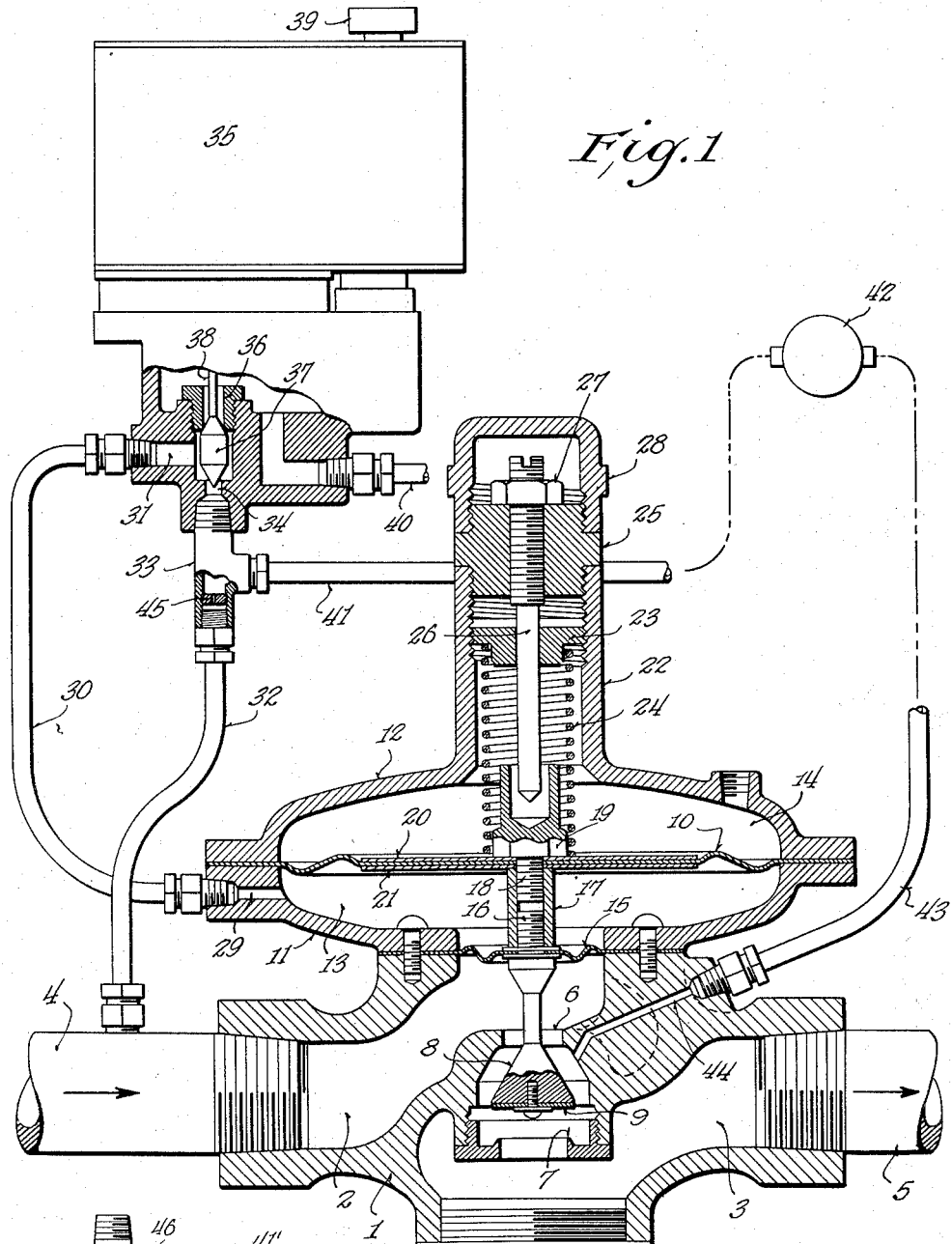
Figure 1 is a sectional view through one form of modulating regulator and a portion of an electric control valve.
Figure 2 is a fragmentary view of a modified construction.

Referring to Figure 1, it will be seen that the modulating regulator has a body portion 1 provided with an inlet 2 and an outlet 3. The inlet communicates with the fluid pressure supply pipe 4 for supplying one ingredient of a combustible mixture to a burner. The outlet 3 communicates with a discharge pipe 5 leading to the burner.

In the form of the invention shown, the gas supply to a burner is the particular ingredient of the combustible mixture that is controlled, but nevertheless it is to be understood that this invention is intended to cover the control of either of the fluid ingredients of the combustible mixture. For example, if it is used to control the compressed air supply in an industrial installation, the ordinary zero pressure regulator would be used to control the gas supply in accordance with the customary and well known practice. For the purpose of this description however, reference will be had to the control of the fuel supply.

The modulating regulator is provided with two valve seats in alignment with each other. The upper valve seat indicated generally at 6 is formed in the body portion and the lower valve seat 7 may be formed in a separate member screwed into the body portion and accessible through the opening provided by a removable plug 8 screwed into the body portion. Any other suitable manner of forming these valve seats could be followed.

A modulating valve 8 cooperates with the valve seat 6 and a cut off valve 9 cooperates with the valve seat 7, thereby providing a modulating valve and a cut off valve with the modulating valve positioned on the high pressure side of the supply line and the cut off valve on the low pressure side of the supply line.

These valves may be formed in different ways and may be rigidly connected together as shown in the drawings. They are operated simultaneously by means of a fluid pressure motor which may consist of the diaphragm 10 located between the lower casing member 11 and the upper casing member 12, thereby forming a lower chamber 13 and an upper chamber 14, the upper chamber 14 in the form of the invention shown in Figure 1 communicating freely with the outside air as shown.

A small sealing diaphragm 15 seals the lower chamber 13 from communication with the inlet portion 2 of the valve body. Obviously any suitable means may be employed for operatively connecting the diaphragm 10 and the modulating and cut off valves 8 and 9. In the form shown, the stem from the modulating and cut off valves is provided with a threaded shank 16 which screws into a sleeve 17. The sleeve also receives the screw threaded shank 18 of a clamping member or nut 19. Upper and lower plates 20 and 21 clamp the diaphragm 10 and are clamped in place by means of the members 19 and 17.

The upper half of the casing 12 extends upwardly and is provided with an internally threaded neck portion 22 which receives an adjustable nut 23 which bears downwardly against a compression spring 24, the lower end of the spring 24 bearing against the upper plate 20 of the diaphragm 10 and being held in position by means of the nut 19 and a reduced portion of the nut 23.

It is to be noted that the nut 23 is slotted so that it may be adjusted by a suitable tool to vary the compression of the spring 24, access being had from the upper side of the nut as will appear from the description. A plug 25 is screwed into the upper end of the threaded neck 22 and closes such neck. This plug receives a threaded minimum flow adjusting screw or pin 26 which is threaded through the nut and which is provided with a lower end positioned within an upward extension of the nut 19 of the diaphragm 10 to thereby limit the upward travel of the diaphragm and consequently limit the extent of closing of the modulator valve 8 so that the modulator valve in its uppermost position may be held away from its seat 6 the desired extent to thereby provide an adjustable minimum flow. A suitable lock nut 27 is provided for locking the screw 26 in place after its desired adjustment has been obtained. A closure cap 28 is provided to prevent tampering with the screw 26.

It is to be noted that the lower chamber 13 below the diaphragm 10 is provided with a port 29 which communicates by means of the pipe 30 with the port 31 of an electric solenoid valve. It is also to be noted that the high pressure line is connected by means of a pipe 32 and a fitting 33 with the lower port 34 of the electric valve. The electric valve is indicated generally by the reference character 35 and is of a conventional well known type. This electric valve is also provided with a vent or discharge port 36. Its valve member 37 may take the form of a double cone as shown and may be operated by means of a rod 38 which extends upwardly and is electromagnetically controlled in a well known manner. This is a conventional type of valve.

These types of electric valves are also provided with manual means 39 for operating the valve in the event of failure of the electric current. When these electric valves are energized, the valve member 37 is in its uppermost position and when de-energized, the valve member 37 drops to its lowest position.

The vent or discharge port 36 of the electric valve is connected to a pipe 40 which may lead to the furnace chamber or to any other point of discharge. The fitting 33 is connected by means of a pipe 41 with one or a plurality of condition responsive means. One of the condition responsive means is indicated by the reference character 42 in Figure 1. This condition responsive means may be of the throttling gas thermostat type well known in the art, or may be of the type shown in Figure 6, or may be a pressurestat or other type of device. The system may include any number of condition responsive means, two having been shown in Figure 5 in connection with another form of the invention hereinafter described.

The discharge side of the condition responsive means 42, which will hereinafter be referred to as a gas thermostat in order to simplify the description, is connected by means of a pipe 43 with the port 44 formed in the body portion 1 of the modulating regulator. This port leads to the space between the valve seats 6 and 7.

It is to be noted that the fitting 33 is provided with a restricted inlet bleed 45 so that the pressure fluid is supplied in a restricted manner. The restricted bleed 45 has a much smaller opening than that of the port 44. It is obvious that this restricted bleed 45 may be removed and a restricted bleed of a different size substituted wherever such adjustment is required to fit different conditions.

The electric valve 35 may be controlled from a room thermostat as indicated for example in Figure 5 and hereinafter more fully described. The throttling member 42 or conidtion responsive member may take the form of a gas thermostat or the form shown in Figure 6 as previously mentioned and as will be described hereinafter in greater detail. Suffice it to say, however, for the purpose of describing the function of the modulating regulator shown in Figure 1, that the condition responsive member 42 responds to the condition of one portion of the system. For example, it may respond to the circulating air or it may respond to the steam pressure or to the temperature of the water in a boiler, or it may respond to other mediums which are heated by the burner. It may be located at any desired point in the system, as will become apparent when the description of Figure 5 is given in detail.

When the condition of the system at which the condition responsive member 42 is such that the condition responsive member 42 is heated, it moves towards closed position and when the desired temperature at this point in the system is reached, it fully closes and cuts off communication between the fitting 33 and the port 44 of the body portion.

Assume that the on and off valve 9 is fully closed and that the temperature of the room, for example, is at the desired point and the temperature of the medium surrounding the condition responsive member 42 is such that this member is in open or partly open position.

Under these conditions, the electric valve would be in its bottom position, that is to say, the valve member 37 thereof would close the port 34. The chamber 13 would communicate freely with the outside air through the pipe 30, the port 36 of the electric valve, and the vent pipe 40, and inasmuch as there was equal pressure on both sides of the diaphragm 10, the spring 24 would hold the cut off valve 9 seated. If the temperature of the room fell to such an extent that the electric valve was energized, thus raising its member 37 into its uppermost position as shown in Figure 1, it would then cut off communication between the lower chamber 13 of the modulating regulator and the outside air and would establish communication through the restricted bleed 45 and the passage 44 with such chamber and pressure would immediately build up in such chamber and thus raise the diaphragm, as pressure fluid would flow from the high pressure side of the line through the bleed inlet 45 through the pipe 30 to the chamber 13, and also would flow through the port 44 and pipes 43, 41 and 30 to the chamber 13.

As the diaphragm 10 moved upwardly, the modulating valve 8 would approach its seat 6 and modulation would occur. It is to be noted particularly that as the modulating valve comes into play, that the port 44 is automatically changed over from communication with the high pressure side of the line to the low pressure side of the line without the use of any auxiliary apparatus whatsoever.

It is to be noted that the cut off valve has a large seat or large port therethrough and has free communication with the low side of the line. The consequence of this is that the modulating regulator will now function as a pressure regulator if no other effect is produced on the condition responsive means 42 and will therefore supply fuel to the burner at the regulated pressure and thus the fuel is adequately supplied for proper ignition and there is no danger of flashback. Also there is no change of a sudden rush of fuel to the burner in an excessive amount which might cause faulty operation of the burner. Instead the fuel is supplied at regulated pressure immediately upon the operation of the modulating regulator.

It is to be noted at this point that the combined cut off valve 9 and modulating valve 8 form a unitary structure and they move away from the on and off valve seat 7 towards the modulating valve seat 6 in a continuous manner until modulation occurs.

If the condition responsive member 42 or any other member in the line 41, 43 remained open, the modulating regulator would function as a pressure regulator at this time, as it is clear that free communication would be provided between the low pressure side of the line and the chamber 13 due to the fact that the port 44 is much larger than the bleed opening 45 and consequently the bleed opening 45 would have no effect on the operation of the device as a pressure regulator. This bleed opening is, of course, made of the appropriate size for the particular function for which the device is intended and similarly the adjustment of the spring 24 is such as to secure the desired regulated pressure at which the fuel is supplied the burner.

Assume now that the temperature rises and the condition responsive means 42 begins to throttle. This artificially increases the pressure in the chamber 13 as this pressure is determined by the restricted bleed 45 and the amount of throttling of the member 42 and consequently the modulating regulator would modulate the flow of fuel to the exact demands of the system. This process would continue until the throttling member 42 fully closed, at which time pressure would build up in the chamber 13 and the modulating valve 8 would move towards closed position until its motion was arrested by the minimum flow adjustment screw 26. Thereafter minimum flow would persist. If this were enough to maintain the temperature at the desired point, nothing further would happen, but if this were more than enough for the requirements of the system, the room thermostat would then open the circuit of the electric valve and the electric valve 35 would be de-energized and the valve member 37 would descend and place the chamber 13 in communication with the outside air. Under these conditions the cut off valve would close and all flow of fuel to the burner would be stopped.

It is to be noted that there is no flow of fuel through the modulating regulator at all when the cut off valve is closed.

It is apparent that the member 42 could be omitted and the supply pipe 32 omitted and the lower end of the fitting 33 closed by a plug. Under these conditions the modulating regulator would function as a combined on and off valve and a pressure regulator. It would immediately come to regulated pressure when the electric valve was energized.

It is also apparent that the bleed plug or high pressure supply bleed 45 could be left as shown in Figure 1 and the condition responsive means 42 omitted. Even under these conditions, the device would operate as a combined pressure regulator and on and off valve for when the electric valve raised its member 37 to its uppermost position, the pressure in the chamber 13 would be that at the low side of the modulating regulator valve as the size of the bleed 45 is very much smaller than the port 44.

It is obvious that instead of having the throttling thermostat 42 control the escape of pressure fluid which had been supplied the chamber 13 through a restricted supply bleed, that it could directly control the supply of fuel and balance this supply of fuel against a restricted leak or exhaust bleed. This result is readily obtained by the modification shown in Figure 2. In this figure, the fitting 33' corresponds exactly to the fitting 33 with the exception that the restricted bleed 46 is placed in communication with the pipe 41', corresponding to the pipe 41, which pipe in this instance would lead directly to the port 44 of the modulating regulator. The throttling gas thermostat 42', corresponding to the gas thermostat 42 of Figure 1, would be placed in the pipe 32', which corresponds to the pipe 32 in Figure 1. The throttling gas thermostat would, therefore, control the supply of pressure fluid to the chamber 13 and balance this supply against the restricted bleed 46. The functioning of the apparatus would be identically the same as that hereinabove described. It is to be noted, however, that the member 42' would open upon an increase in temperature and close for a decrease of temperature.

Even if the device were installed where there was either too much restriction through the meter and pipe leading to the apparatus or if there were too many burner sections, nevertheless the modulating regulator would not function erratically. Under these abnormal conditions it is clear that the pressure on the low pressure side leading to the burner might be lower than it should be and the modulating valve would try to open up to a greater extent. It could not move to such a position that the on and off valve would close, if the electric valve were in its uppermost position, for, as the on and off valve approached its seat, the pressure in the space between the two valve seats would rise and would thus automatically prevent improper closing of the on and off valve until called for by the electric valve.

It will be seen that by having the port 44 open into the space between the on and off valve and the modulating valve, that great flexibility is provided for the device as the port is automatically changed over from connection with the high side of the line to the low side of the line when the modulating regulator opens without the use of any auxiliary apparatus whatsoever. Two ways in which the device could be used have been described in detail hereinabove.

It is to be noted also that when the modulating regulator opens the on and off valve, that the on and off valve and modulating valve move continuously away from the seat of the on and off valve towards the seat of the modulating valve and thus there is adequate flow of fuel during ignition, thereby preventing flashback under all conditions.

It is to be understood that the particular shape of the two valves, namely, the modulating valve and the on and off valve, may be varied, one construction being shown for the purpose of illustration.

In the form of the invention shown in Figure 1, it is clear that the operation of the modulating regulator depends on the difference in pressure on opposite sides of the diaphragm. In the form shown in Figure 1, one of the pressures is that of the atmosphere on the upper side of the diaphragm and remains constant at all times while the pressure below the diaphragm is varied, thereby giving variation in the difference in pressure acting on the two sides of the diaphragm.

Figure 3:
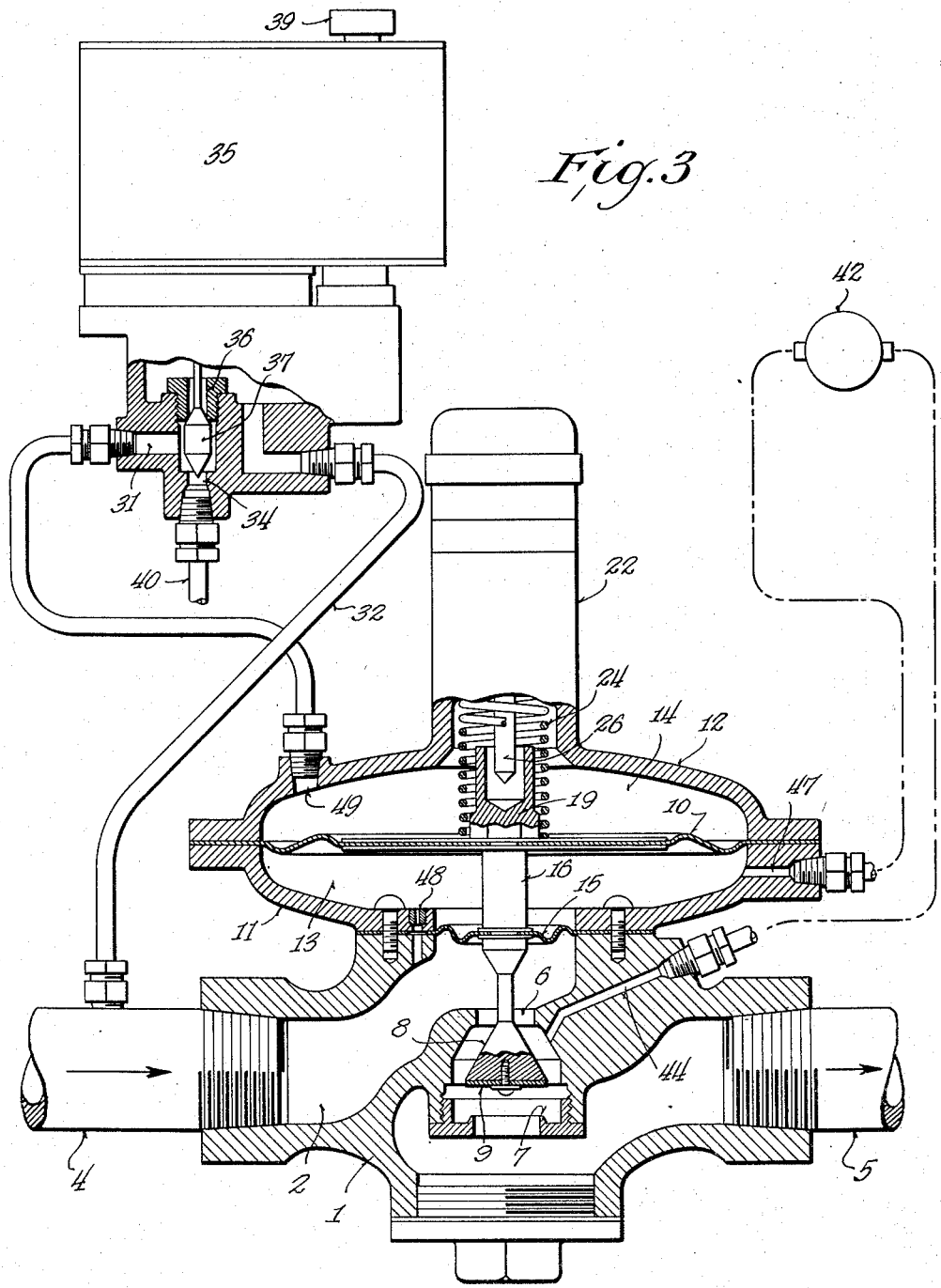
Figure 3 is a view corresponding to Figure 1 showing a further form of modulating regulator.

The same result may be accomplished by the construction shown in Figure 3. In this figure the same reference characters are generally followed as those used in Figure 1 to indicate similar parts. In general the construction is substantially the same as that shown in Figure 1. The lower chamber 13 of the modulating regulator is provided with a port 47 which communicates with the port 44 through the condition responsive means 42, and this lower chamber also communicates with the inlet 2 or high pressure side of the line by means of an apertured plug 48 which supplies a restricted amount of pressure fluid to the chamber 13. The upper chamber 14 above the diaphragm 10 is provided with a port 49 which communicates with the port 31 of the electric valve 35. The port 36 of the electric valve communicates without restriction with the high pressure side of the line, as shown in the drawings. The lower port 34 of the electric valve communicates freely with the vent pipe 40.

When the electric valve 35 is energized by its circuit being closed by the room thermostat for instance, the valve member 37 rises and closes the port 36, thus cutting off communication between the upper chamber 14 and the high pressure side of the line and establishing communication between such upper chamber and the vent pipe 40. Under these conditions, the diaphragm 10 rises because pressure fluid is supplied through the restricted bleed 48 to the lower chamber 13, the fluid in the chamber 14 freely exhausting to the air.

The port 44 of the modulating regulator valve body had been initially connected with the high pressure side, but when the combined modulating valve and cut off valve rises, communication of the port 44 is automatically transferred from the high pressure side of the line to the low pressure side of the line and if the condition responsive device 42 is fully opened, the device operates as a pressure regulator as the pressure in the chamber 13 will be substantially the same as that on the low pressure side of the line as the relative size of the restricted supply bleed 48 and the port 44 is such that there is substantially no effect produced by the high pressure supply bleed 48 under these conditions.

If the temperature of the circulating medium rises, the throttling thermostat 42 will partly close and the pressure in the chamber 13 will rise and thereby cause the modulating valve 8 to more closely approach its seat 6. If the temperature continues to rise, the modulating valve 8 will rise to minimum flow position as the condition responsive member 42 will fully close.

If the supply of fuel is just sufficient to maintain the desired temperature, nothing further will happen, but if the temperature rises above the desired temperature, the room thermostat will open the circuit of the electric valve 35 and the valve member 37 will descend, thereby supplying pressure fluid to the upper chamber 14. In view of the fact that the pressure is now equal on both sides of the diaphragm 10, the spring 24 will cause the on and off valve 9 to close.

In the ordinary adjustment of the parts of the system, when the temperature begins to fall, the condition responsive means 42 will move towards open position but the modulating regulator will not move from its closed position until the valve member 37 of the electric valve moves to its uppermost position. When this occurs, the pressure in the chamber 14 is released and pressure builds up in the chamber 13, thus causing the diaphragm 10 to rise, thereby opening the on and off valve 9 and moving the modulating valve 8 upwardly, thereby supplying fuel to the burner, the port 44 being now automatically transferred from communication with the high pressure side of the line to communication with the low pressure side of the line. It is apparent, therefore, that the modulating regulator will initially permit an adequate flow of fuel to the burner at a pressure not exceeding the maximum regulated pressure for which the device is set.

Modulation occurs when the condition responsive member 42 begins to throttle down and thereby increase the pressure in the chamber 13 above that required for the operation of the device as a pressure regulator.

It is also clear that if the member 42 were omitted and the port 47 directly connected to the port 44, that the device would operate as a combined on and off valve and pressure regulator. The bleed member 48 could then be omitted and instead a plug could be substituted. Thereafter, when the temperature of the room rose above the desired point, the electric valve 35 would drop its valve member 37 to its lowermost position and pressure would be supplied to the chamber 14. The cut off valve would then close. Thus it would also be possible with this form of the invention to make a slight alteration in the system and cause the device to operate solely as a combined on and off valve and a pressure regulator.

It is obvious that although a single condition responsive means 42 has been shown in Figure 3, that any number of condition responsive means could be used as previously described.

Figure 4:
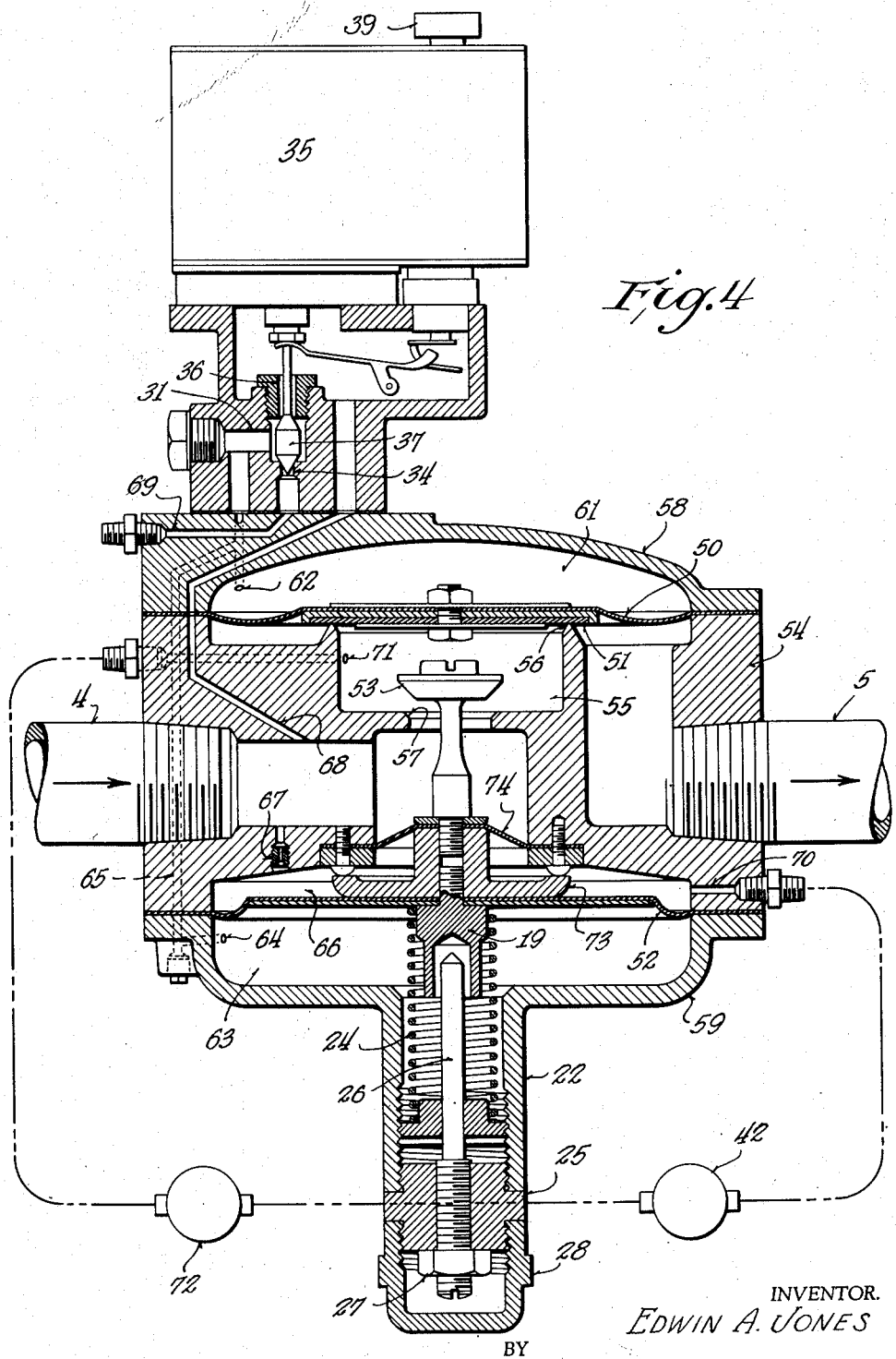
Figure 4 is a view corresponding to Figure 1 showing a still further form of modulating regulator.

The invention may take still other forms. For instance as shown in Figure 4, a construction is shown in which two diaphragms are employed, the diaphragm 50 controlling the on and off valve 51 and the diaphragm 52 controlling the modulating valve 53. These diaphragms are located on opposite sides of the body portion 54 of the modulating regulator and a space or opening 55 is provided between the valve seat 56 of the on and off valve and the valve seat 57 of the modulating valve as previously described.

The upper diaphragm is held clamped in place by means of the upper casing 58 and the lower diaphragm is clamped in place by means of the lower casing 59. This lower casing is provided with the extended neck portion 22 which carries the equipment previously described, including the spring 24 and the adjusting screw or pin 26 for adjusting the minimum flow position of the throttling valve 53. The upper casing 58 carries the electric valve 35 which has been previously described. This electric valve is the same in all forms of the invention and it may be equipped with a manually adjustable means 39 in the conventional manner for controlling the valve member 37 in the event that the electric current fails and it is desired to operate the electric valve manually.

The upper chamber 61 above the upper diaphragm 50 communicates with the port 31 of the electric valve by means of a passageway or port 62. The lower chamber 63 below the lower diaphragm communicates with the passageway 62 by means of ports or passageways 64 and 65. The upper chamber 66 above the lower diaphragm 52 communicates with the high pressure side of the line by means of a restricted supply bleed 67 which consists of a removable apertured plug so that for different conditions plugs with different size apertures may be employed to secure an adjustment of the rate of flow of pressure fluid into the chamber 66. Also it is preferable to make the passageway 64 smaller than the passageway 62 for a reason hereinafter to appear. It is to be borne in mind also that if desired, these passageways 64 and 62 may be made of the same size and an adjusting needle valve may be interposed in the passageway 65 to provide the relative difference in area.

The port 36 of the electric valve communicates at all times with the high pressure side of the line by means of the port or passageway 68. The port 34 of the electric valve communicates with the vent or exhaust port or passageway 69. The chamber 66 above the lower diaphragm is provided with a port or passageway 70 which is connected through condition responsive means with a port or passageway 71 leading to the space 55 between the on and off valve and the modulating valve.

As described in connection with the first two forms of the invention, one or more condition responsive means may be employed. Two have been shown in Figure 4, namely, the condition responsive means 42 previously described and an additional condition responsive means 72 which may take the form shown in Figures 6 and 7 and hereinafter described. It is to be distinctly understood, however, that in all forms of the invention it is intended that either one, two or more condition responsive means could be employed, two having been shown in Figure 4 and in the diagrammatic showing of Figure 5.

As previously described, when the electric valve 35 is de-energized, its valve member 37 is in its lowermost position as shown in Figure 4. Under these conditions, pressure from the high side of the line is supplied through the port 36 of the electric valve to the chamber 61 above the upper diaphragm and to the chamber 63 below the lower diaphragm. Pressure also is supplied to the chamber 66 above the lower diaphragm 52 by the supply bleed 67 and inasmuch as the pressures on both sides of the lower diaphragm 52 are equal, the spring 24 will move the modulating valve to its uppermost position.

In the specific form chosen for illustration, the member 73 located on the upper side of the lower diaphragm 52 constitutes a limit member and engages a stationary portion of the valve body. A suitable small sealing diaphragm 74 is provided to separate the chamber 66 on the upper side of the lower diaphragm 52 from the high pressure side of the line. The on and off valve 51 is in closed position and the modulating valve 53 is in fully open position under the conditions outlined hereinabove.

Ordinarily, when the system is about to call for heat, the condition responsive means 42 and 72 would be open and the electric valve would have its member 37 in the lowermost position. Under these conditions, an additional means of supplying pressure fluid to the upper chamber 66 above the lower diaphragm 52 would be provided from the port 71 to the port 70.

If the temperature in the room or other point of control drops below a predetermined value, the electric valve is energized, thus raising its valve member 37 and closing its upper port 36 and opening its lower port 34. Under these conditions the pressure in the upper chamber 61 is relieved through the vent 69 and the on and off valve rises. The pressure from the chamber 63 below the lower diaphragm 52 is also vented through the passageways 64 and 65, but inasmuch as the port or passageway 64 is smaller than the port or passageway 62, the modulating valve will move towards regulated position more slowly and therefore an adequate supply of fuel is supplied the burner during ignition, irrespective of the position of the condition responsive means 42 and 72. Normally however, these condition responsive means are in open position under the conditions hereinabove outlined and are therefore open.

As soon as the on and off valve opens, the port 71 is automatically transferred from connection with the high side of the line to connection with the low side of the line and consequently the pressure in the chamber 66 is that of the low side of the line as the relative area of the supply bleed leak 67 and the port 71 is such that there is substantially no effect produced under these conditions by the high pressure supply bleed leak 67. Therefore, the modulating regulator will adjust the pressure of the fuel supplied initially during ignition to a pressure not exceeding that of the selected regulated pressure. If either or both of the condition responsive means 42 and 72 is partially closed, an artificial pressure is built up in the chamber 66 so that the modulating valve 53 will move nearer its seat and consequently will modulate the fuel flow still more in accordance with the demands of the system.

Any number of condition responsive means could be employed, two having been shown. Assume for simplicity of illustration that the condition responsive means 42 now responds to an increase in temperature and throttles. The modulating valve 53 will move still closer to its seat and this will continue as the temperature rises until the modulating valve 53 arrives at minimum flow position where further motion is arrested as previously described. Under these conditions minimum flow persists.

If the minimum flow is sufficient to just maintain the temperature at the desired point, nothing further happens, but if the temperature rises above the desired point, for instance in the room, the room thermostat will open the circuit of the electric valve 35 and the valve member 37 thereof will descend and will place high pressure fluid in the chamber 61, causing the on and off valve 51 to close. This on and off valve, therefore, cuts off all flow of fuel to the burner. Additional high pressure fluid is supplied to the lower chamber 63 below the lower diaphragm 52 and high pressure fluid is also supplied through the high pressure bleed 67 to the upper chamber 66 above the lower diaphragm 52. Inasmuch as the pressures on opposite sides of the diaphragm are equal, the spring 24 will move the modulating valve 53 to its uppermost position as shown in Figure 4.

If the ports 70 and 71 were directly connected and the condition responsive means omitted, the device would operate as a combined on and off valve and pressure regulator, for it is obvious that when the on and off valve 51 opens, the port 71 is automatically transferred from the high pressure side of the line to the low pressure side of the line and consequently the modulating valve 53 would operate as a pressure regulator.

If the device were used as a straight pressure regulator, the high pressure supply bleed 67 could be omitted and a solid plug substituted if desired, though this would not be necessary.

If it is desired, the port 65 could be omitted and the port 64 could communicate directly with the outside air. This arrangement would not be as advantageous as the one shown and described, for under these conditions when the main on and off valve closed, pressure fluid would build up in the chamber 66 above the lower diaphragm and the modulating valve 53 would close. Therefore, whenever the on and off valve opened, the modulating valve would start from closed position and not from open position as previously described.

The condition responsive means 42 or 72 could take any desired form. One form has been described for the condition responsive means 42 and this condition responsive means could be placed wherever desired as previously described. The other condition responsive means 72 could be similar to the condition responsive means 42 and could be placed at a different location if desired. However, the condition responsive means 72 has been shown as a special form of condition responsive means and serves a still further purpose over and above that served by the condition responsive means 42. This will be apparent when Figures 5, 6 and 7 are examined. In these figures, it will be seen that the condition responsive means 72 works in conjunction with a room or other thermostat shown in Figure 5 and is controlled from the auxiliary movable contact 75 and the auxiliary stationary contact 76.

The condition responsive means will be described in detail hereinafter, but suffice it to say for the present that it is a heat motor that cuts off communication between the ports 77 and 78 when it is heated by electric energy supplied it in a manner immediately to appear and opens when the electric energy is cut off.

Referring to Figure 5, it will be seen that a room or other thermostat indicated generally at 79 has been illustrated and this thermostat is so arranged that it moves to the left as viewed in Figure 5 when it is heated. It is provided with a bi-metallic portion 80 and with an apertured plate or extension 81 within which a bowed contact strip 82 is positioned.

This construction is similar to that disclosed in the prior Frank A. Gauger Patent No. 1,954,446, of April 10, 1934, for Thermostat, and it is apparent that the member 81 constitutes a slotted frame within which the bowed spring contact strip 82 is positioned and pivoted at opposite ends.

If it is assumed that the temperature in the room is slightly below the desired temperature, the parts will be in the position shown in Figure 5 and the bowed contact strip 82 will be in engagement with the live contact 83 and out of engagement with the dead contact or stop 84. If the temperature rises still further and arrives at the desired point, the auxiliary contacts 75 and 76 will close. If the temperature rises beyond the desired point and the thermostat moves still farther to the left, a time will come, depending on the adjustment of the member 83, when the bowed spring 82 will snap over to the right out of engagement with the live contact 83 and in engagement with the dead contact or stop 84. This occurs shortly after the desired room temperature has been passed.

A small step-down transformer 85 is provided and has its primary connected to the house mains 86. One side of the secondary is connected by means of the conductor 87 with the thermostat 79 and the other side of the secondary is connected by means of the conductor 88 to the electric valve 35. The conductor 88 is also connected by means of the conductor 89 to one side of the condition responsive means 72, the other side of the condition responsive means 72 being connected by means of the conductor 90 with the auxiliary stationary contact 76.

Any of the forms of the modulating regulator as shown in Figures 1, 3 and 4 could be employed. The form shown in Figure 4 has been illustrated in Figure 5.

Burner means indicated at 91 supplied with pilot means 92 have been shown in Figure 5 and it is to be noted that the pilot supply is ahead of the modulating regulator and also ahead of a manual cut off valve 93. If desired, a cut off valve could be placed in the pilot line in accordance with the usual practice though it has been omitted in Figure 5.

Assume that the burner is operating and that the temperature in the room is rising but has not yet reached the desired temperature. The thermostat will continue to move to the left and the auxiliary contacts 75 and 76 will be brought into engagement with each other and close the circuit of the condition responsive means 72. This means will be heated by a small amount of electric energy supplied it and will cut off communication between the port 70 and the port 71 of the form shown in Figure 4, or between the port 29 and the port 44 shown in Figure 1, or between the port 47 and the port 44 shown in Figure 3, thereby causing the modulating valve to move towards minimum flow position.

If this minimum flow is sufficient to maintain the desired temperature, nothing further happens. If it is insufficient to maintain the desired temperature, the thermostat moves to the right and opens the auxiliary contacts and the condition responsive means 72 moves to open position, allowing the modulating regulator to adjust itself to an increased fuel flow.

On the other hand, assume that the temperature in the room rose slightly beyond the desired temperature although the modulating valve remained at minimum flow position, the auxiliary contacts 75 and 76 being in engagement. Under these conditions, further motion of the thermostat to the left would cause the bowed spring 82 to snap to the right as viewed in Figure 5 and cut off all flow of electric current. The electric valve 35 would then move its valve member 37, see Figures 1, 3 and 4, to its lowermost position and the on and off valve would close, cutting off all fuel flow to the burner. The modulating valve in the forms of the invention shown in Figures 1, 3 and 4 would move to open position.

Assume now that the temperature of the room dropped below the desired temperature. The thermostat would move to the right as viewed in Figure 5 and the bowed spring 82 bearing against the stationary contact or stop 84 would be caused to snap over to the left into engagement with the stationary contact 83, thus energizing the electric valve 35 and causing the on and off valve to move to open position, thus supplying fuel to the burner.

The condition responsive means 42 could be at any desired point in the system as previously described. It could be in the dome of the furnace or in the smoke pipe or in the boiler, and would thus act as a limit control, or it could be in the cold air return or at any point in the circulating medium. Additionally, any number of throttling gas thermostats 42 could be employed and could be located wherever needed. This throttling thermostat if used as a limit control, would, of course, prevent excess heating of the furnace under all conditions. If it were placed in the circulating medium, it would act as a modulation control and, as stated, any number of these devices could be employed, certain ones acting as limit controls and others as modulating controls.

As the temperature of the circulating medium rose, the modulating valve would be adjusted to its modulated position and would adjust the fuel flow in accordance with the demands of the system. If the temperature continued to increase, the modulating valve would, of course, move to its minimum flow position as described hereinabove and the sequence of operations hereinabove described would follow in accordance with the particular condition then obtaining.

The condition responsive means could take any of several different forms, one of which is shown in Figures 6 and 7. In the form chosen for illustration, the condition responsive means comprises a valve member having a body portion 94 provided with the ports 77 and 78 as hereinbefore described. A small rotary valve indicated at 95 is revolubly mounted in the body portion and is provided with a passage therethrough as indicated at 96, normally placing the ports 77 and 78 in communication. It is provided with a collar 97 which seats on a knife edge annular shoulder formed on the body portion and thus provides a gas tight joint which is pressed downwardly by means of a spring 98.

This rotary valve 95 is provided with an arm 99 which is slotted as indicated at 100 in Figure 7 and is provided with an extension or finger 101. The arm 99 is insulated from electrical connection with any other part of the apparatus. A bimetallic member 102 is provided and is rigidly attached to an arm 103. This arm is carried by a plate 104 which is provided with a slotted extension 105 which may be adjusted as indicated in Figure 7 to provide an adjustment of the bimetallic member 102. The plate 104, see Figure 6, is movably clamped to an insulating base 106 by means of a bolt 107. This bolt is provided with a headed portion as shown at 108, and with a cylindrical extension 109 projecting upwardly therefrom and having a threaded upper end 110 which receives a nut 111, and is provided with a reduced threaded extension 112 which receives a nut 113. The nut 111 clamps an insulating spool 114 in place and the nut 113 clamps the spring member 98 in place. The insulating spool 114 carries a heating element 115 and is provided with a pair of terminal leads 116 and 117, see Figure 7. One terminal lead is connected to a terminal 118 which carries a spring contact arm 119 and the other terminal lead is connected to a terminal 120 which in turn connects to the conductor 90. The spring contact strip 119 normally engages a stationary contact 121 which is connected to the conductor 89, see Figure 5.

The bi-metallic member 102 is coiled around the heating element 115 but is out of contact therewith and is provided with a rigid extension arm 122 having an upstanding finger 123 which carries an insulating roller 124 fitting within the slot 100 of the arm 99 of the valve 95.

The purpose of this construction will be apparent from a consideration of Figure 5 in connection with Figures 6 and 7.

Assuming the burner is in operation, when the room temperature arrives at the desired point, the auxiliary contacts 75 and 76 will close. This will close the circuit through the heater 115, see Figure 6, and will heat the bi-metallic member 102 and cause the arm 99 to rock in a clockwise direction to close the valve 95 by rotating such valve. This will cause the modulating valve to move to minimum flow position. It is to be noted that when the arm 99 rotates in a clockwise direction to close the valve 95, it will break the circuit through the heating element by moving the contact arm 119 away from the stationary contact 121. Consequently after an interval of time the bi-metallic member 102 will cool and will consequently reopen the valve 95.

If the room temperature has fallen slightly below the desired temperature, the contacts 75 and 76 will be separated and the modulating valve will have moved to an adjusted position to supply a greater quantity of fuel. On the other hand, if the room temperature is still at the desired temperature, the circuit through the heater will be closed as soon as the contact strip 119, Figure 7, engages the stationary contact 121 and the heater 115 will begin to heat the bi-metallic member 102.

This last described construction is for the purpose of preventing even a small over-shooting as the time interval between the beginning of the heating of the heating element 115 and the actual closing of the valve 95 and the interval between the automatic opening of the circuit of the heating element by the motion of the spring arm 119 and the cooling of the bi-metallic member 102, with the consequent opening of the valve 95, may be made of any desired lengths. This construction, therefore, provides for the moving of the modulating valve to minimum position as soon as the temperature of the room arrives at the desired temperature and allows the modulating valve to again move from minimum position to its adjusted position as called for by the other temperature responsive means after a certain interval of time has elapsed. This causes a periodic operation of the burner between the adjusted position due to the automatic setting of the temperature responsive means 42 and the minimum flow position and thereby provides for a cyclic operation of the burner between these two values. Even if this periodic operation of the burner from its adjusted position as determined by the condition responsive means 42 to its minimum flow position supplies too much heat and the room temperature rises slightly higher, the bowed spring 82 will snap to the right as viewed in Figure 5, and the burner will be cut off entirely.

It will be seen that very simple types of modulating regulators have been provided by this invention which provide for the on and off operation of an on and off valve and which provide for the modulation of the fuel supplied the burner in accordance with the exact needs of the system, the supply of fuel being never at a pressure exceeding a maximum predetermined regulated pressure.

It will be seen further that the modulating regulators allow considerable flexibility in the manner in which they are installed and used. They may be used as a combination on and off valve and modulating valve which latter operates to modulate the fuel flow in exact accord with the demands of the system, or they may be used as a combined on and off valve and modulating valve which will modulate the fuel flow to maintain the fuel supplied the burner at a certain predetermined regulated pressure for which the device is set.

It will be seen further that the invention provides a system whereby any desired number of condition responsive means can be employed, whether these condition responsive means are throttling thermostats, pressurestats, heat motors, or other types of devices.

It will be seen further that in every form of the invention the modulating valve is placed ahead of the on and off valve and closes against fuel pressure, thereby insuring a smooth operation, and that the on and off valve is placed after the modulating valve and always seats with pressure, thus insuring a positive operation. This arrangement guards against fluttering or chattering of either or both of the valves, but instead insures a smooth and positive operation at all times.

It will be seen further that a novel modulating regulator has been provided in which the port leading from a control chamber for operating a pressure motor is automatically transferred from the high pressure side of the line to the low pressure side of the line whenever the on and off valve opens and is automatically transferred back to the high pressure side of the line whenever the on and off valve closes without the necessity of using any other apparatus to accomplish this transfer from one side of the line to the other but that the transfer is inherent in the construction of the device itself.

It will also be seen that the construction is such that the modulating valve and on and off valve are directly connected to the diaphragm or movable wall of the fluid pressure motor without any intermediate mechanism interposed between such parts. This results in a very simple construction and one which is positive and reliable in its operation. The invention provides a unitary construction of modulating regulator in which both an on and off valve and a modulating valve are provided, and in certain forms of the invention in which both of these valves are directly operated from a single movable wall, such for instance as a diaphragm.

The expressions pressure motor means or pressure motor having a movable wall are intended to cover any type of pressure motor, such for example as a diaphragm, which is movable or a piston located in a cylinder, or a bellows device, or any other means which is controlled by fluid pressure whether or not biasing means are provided.

Also wherever the relative pressure acting on opposite sides of the movable wall is said to be varied, it is to be understood that this variation in the relative pressure may be produced by varying both of the pressures or by varying only one of the pressures, provided, however, that the relation between the two pressures is varied to thereby vary the effective force acting on the movable wall.

Although this invention has been described in considerable detail, it is to be understood that such description is intended as illustrative rather than limiting, as the invention may be variously embodied and is to be interpreted as claimed.

I claim:

1. A modulating regulator for controlling fluid flow to heating means comprising pressure motor means including a movable wall having a chamber on each side thereof, a main fluid flow passage sealed from the movable wall, a pair of spaced valve seats in the said passage one of which constitutes a modulating valve seat and the other of which constitutes an on and off valve seat, a unitary valve structure operated by said pressure motor means and including a modulating valve and an on and off valve cooperating respectively with said modulating valve seat and said on and off valve seat, said valve seats constituting ports arranged in series for the fluid flow, said valves simultaneously moving in alternate directions to perform their respective functions of modulation and cut off, biasing means biasing said unitary valve structure towards cut off position, said pressure motor means being connected to the line pressure and to the pressure subsequent to the modulating valve, to provide pressures therein to oppose the biasing means, and means operated in response to variations in predetermined external conditions for continuously varying the said pressures provided in opposition to the biasing means being varied between values above the pressure subsequent to the modulating valve and the said pressure subsequent to the modulating valve, and means for causing the pressures on opposite sides of the movable wall to approach equality to an extent sufficient at least for said biasing means to close said on and off valve.

2. A modulating regulator for controlling fluid flow to heating means comprising pressure motor means including a movable wall having a chamber on each side thereof, a main fluid flow passage sealed from the movable wall, a pair of spaced valve seats in said passage one of which constitutes a modulating valve seat and the other of which constitutes an on and off valve seat, a unitary valve structure operated by said pressure motor means and including a modulating valve and an on and off valve cooperating respectively with said modulating valve seat and said on and off valve seat, said valve seats constituting ports arranged in series for the fluid flow, said valves simultaneously moving in alternate directions to perform their respective functions of modulation and cut off, biasing means biasing said unitary valve structure towards cut off position, said pressure motor means having one of its chambers connected to the space between said valve seats, a first condition responsive means cooperating with said connection controlling the relative pressure in the chambers on opposite sides of said movable wall to cause said on and off valve to close, and a second condition responsive means cooperating with said connection controlling the relative pressure when said on and off valve is open to cause said modulating valve to modulate, said second condition-responsive means being responsive to predetermined external conditions.

3. A modulating regulator for controlling fluid flow to heating means comprising pressure motor means including a movable wall having a chamber on each side thereof, a main fluid flow passage sealed from the movable wall, a pair of spaced valve seats in said passage one of which constitutes a modulating valve seat and the other of which constitutes an on and off valve seat, a unitary valve structure directly connected to said movable wall for the same lined movement therewith including a modulating valve and an on and off valve cooperating respectively with said modulating valve seat and said on and off valve seat, said valve seats constituting ports arranged in series for the fluid flow, said valves simultaneously moving to perform their respective functions of modulation and cut off, biasing means biasing said unitary valve structure towards cut off position, said pressure motor means having one of its chambers connected to the space between said valve seats, a first condition responsive means cooperating with said connection controlling the relative pressure in the chambers on opposite sides of said movable wall to cause said on and off valve to close, and a second condition responsive means cooperating with said connection controlling the relative pressure when said on and off valve is open to cause said modulating valve to modulate, said second condition-responsive means being responsive to predetermined external conditions.

4. A combined pressure reducing and cut-off valve device for limiting the maximum pressure of fluid to be supplied to a heating means, comprising pressure motor means having a first chamber and a second chamber divided by a movable wall, a pair of spaced valve seats forming ports arranged in series for the fluid flow, a regulating valve operating against the fluid flow cooperating with one seat and a cut-off valve operating with the fluid flow cooperating with the other seat, both of said valves being mechanically controlled from said pressure motor means, said device having a passageway leading from the space between said ports to said first chamber, the space between said ports being subject to the inlet pressure when said cut-off valve is closed and being subject to the outlet pressure when said regulating valve is functioning, and means independent of both said regulating valve and said cut-off valve for selectively connecting the second chamber to the inlet side of said valve device or to the atmosphere.

5. In a mechanism of the kind described, a valve device having an inlet and outlet, a pair of valve seats between the inlet and the outlet, a valve member having a first and a second valve portion, one for cooperation with each valve seat, said valve member being movable to bring either valve portion toward its respective seat, and the seats being disposed in the line of movement of the valve member, a pressure applying means including a movable wall, biasing means urging the wall in one direction, a pressure chamber adapted to receive pressure to oppose the biasing means, means connecting the movable wall with the valve to cause the valve to move in response to pressure conditions within the pressure chamber, said movable wall being adapted to cause the valve device to move the first portion to cut-off relationship to its seat upon existence of certain pressure conditions, and to move said first portion away from its seat, and the second portion into flow regulating position relative to its seat in response to other pressure conditions, and means providing a fixed port disposed on the inlet side of the first valve portion, whereby to provide inlet pressure in the pressure chamber when said first valve portion is closed, and said port being also disposed relative to the second valve portion so as to be on the outlet side thereof when the second valve portion is in cooperating relation to the second valve seat.

6. In a mechanism of the kind described, a valve device having an inlet and an outlet, a first and a second valve seat between the inlet and the outlet, the first seat being toward the inlet and the second seat toward the outlet, walls joining the two seats and providing a valve chamber between them, a valve member within the valve chamber and movable toward either valve seat, the seats being aligned with the direction of movement of the valve member, a pressure chamber including a member movable in response to pressure changes within the chamber, means connecting the movable member with the valve member, to move the valve member away from the second valve seat upon increase of pressure in the pressure chamber, and a connection joining the presence chamber and the valve chamber, said connection entering the valve chamber between the two seats, and subjected to inlet pressure when the valve member is closed relative to the second valve seat, and subjected to outlet pressure when the valve member is opened relative to the second seat and throttled relative to the first seat, a connection joining the pressure chamber to exhaust and means controlling the connections to admit inlet pressure to the chamber to open the valve member relative to the second seat, to admit outlet pressure to effect regulation of position of the valve after it is opened, and to operate the exhaust connection to close the valve.

7. In a mechanism of the kind described, a valve including a body having an inlet and an outlet, walls providing a valve chamber, an inlet valve seat and an outlet valve seat, both in said chamber, both valve seats facing into the chamber, a unitary valve member within the chamber having a first portion adapted to cooperate with the inlet seat to control flow therethrough, a second portion adapted to cooperate with the outlet valve seat to cut-off flow therethrough, both portions being contained within the valve chamber so that cut-off is effected with the flow, and flow control is effected against the flow, a pressure-responsive means connected to the unitary valve member, and including a pressure chamber and an element connected with the valve member, movable in response to increase in pressure changes in the pressure chamber to move the valve member from the outlet seat toward throttling relationship with the inlet valve seat, and a port extending from the valve chamber between the valve seats to the pressure chamber, said port being adapted to take inlet pressure to the pressure chamber when the valve is closed relative to the outlet seat, and to take outlet pressure when the valve is moved toward the inlet seat, whereby said valve may be opened by inlet pressure and regulated by outlet pressure.

8. In a mechanism of the kind described, a main valve member having an inlet and an outlet, a pair of valve seats between the inlet and the outlet, valve means selectively cooperable with said seats, a pressure chamber, means connected to the valve means and operable in response to pressure changes in the chamber, biasing means opposing the pressure in the pressure chamber, a port from between the two valve seats, a port from the high pressure side of the line, said ports being connected into the pressure chamber, modulating means to control the pressure in the chamber to vary it within the limits of the inlet line pressure and the pressure between the two valves, and additional means to equalize the pressure in the chamber and that of the biasing means to effect closure of the valve means with one of its seats.

9. In a mechanism of the kind described, a valve having an inlet and an outlet, an inlet and an outlet valve seat between the inlet and the outlet of the valve, walls joining the valve seats to provide a valve chamber, valve means adapted to cooperate with the inlet seat to control flow therethrough, and adapted to cooperate with the outlet seat to cut off flow therethrough, pressure-responsive means including a housing providing two chambers separated by a movable diaphragm, and both chambers being separated from the fuel flow through the valve, means connecting the diaphragm to the valve means to displace the same in response to relative pressure conditions in the pressure chambers, means adapted to connect one of the pressure chambers to the valve chamber, means adapted to connect one of the chambers to the inlet side of the valve, and means operable in response to changes in external conditions to regulate one of said connecting means to produce relative pressures in said pressure chambers to modulate the valve means with respect to said inlet valve seat, and means to regulate one of said connecting means to produce relative pressures in said pressure chambers to effect moving of said valve means to cut-off position relative to the outlet valve seat.

10. In a mechanism of the kind described, a valve device having an inlet and an outlet, walls providing a valve chamber between the inlet and the outlet, a pair of valve seats in the walls, the first toward the inlet and the second toward the outlet, a unitary valve member having a first portion adapted to cooperate with the first valve seat to control flow therethrough and a second portion adapted to cooperate with the second valve seat to cut off flow therethrough, a pressure chamber sealed from the valve chamber and having a movable element displaced in response to pressure changes within the pressure chamber, means connecting the valve member to the movable element to cause operation of the member upon movements of the element, biasing means adapted to produce pressure conditions on the element to bring same into position to cause the second portion of the valve to cut-off flow, to subject the valve chamber to inlet pressure, means connecting the valve chamber with the pressure chamber to effect pressure changes in the pressure chamber corresponding to those in the valve chamber, said connection being adapted to admit line pressure to the pressure chamber when said second portion of the valve member is in cut-off relation to the second seat, means controlling pressure conditions acting on the movable element to make the same responsive to pressure conditions effected through said connection, whereby the valve member may be displaced to remove the second portion from cut-off relation and to bring the first portion to flow control relation with the first seat, said connection from the valve chamber to the pressure chamber being then subject to pressure back of the second valve portion, and the valve being adapted to be regulated in accordance with variations in said pressure.

11. In a mechanism of the kind described, a valve device having an inlet and an outlet, walls providing a valve chamber between the inlet and the outlet, a pair of valve seats in the walls, the first toward the inlet and the second toward the outlet, a unitary valve member having a first portion adapted to cooperate with the first valve seat to control flow therethrough and a second portion adapted to cooperate with the second valve seat to cut off flow therethrough, a pressure means comprising a movable element connected with the valve member, and first and second pressure chambers on opposite sides of the element to move it in accordance with relative pressures in the chambers, pressure means for the first chamber including a connection to a gas pressure source, exhaust means for said first chamber, and means selectively to render said first chamber subject to exhaust or to the pressure of said pressure source, a port connecting the second chamber to the valve chamber, said rendering means being operable to produce pressure conditions in the first chamber to overcome pressure conditions in the second and thereby to move the second portion of the valve into cut-off relation with the second seat, and said rendering means being operable to subject the first chamber to exhaust to reduce the pressure conditions thereof below the pressure conditions of the second chamber whereby the valve member is displaced to relieve the second portion from its cut-off relationship and to bring the first portion into flow control relationship with the first seat, said displacement of the valve member shifting the pressure at the port in the valve chamber from inlet pressure to reduce pressure to control the position of the first portion of the valve by said reduced pressure.

12. In a mechanism of the kind described, a valve having an inlet and an outlet, walls providing a valve chamber, an inlet seat and an outlet seat in said valve chamber, valve means including a cut-off valve adapted to cooperate with the outlet valve seat to cut off or admit flow therethrough, and a modulating valve adapted to cooperate with the inlet valve seat to control flow therethrough, a pressure chamber means, movable means adapted to be moved by changes in pressure conditions in the pressure chamber means, biasing means adapted to urge the movable means to close the cut-off valve in opposition to pressure conditions in the pressure chamber means, means to render the biasing means ineffective to close the cut-off valve, a connection between the pressure chamber means and the inlet side of the valve to admit line pressure to said pressure chamber means, fixed connecting means between the valve chamber and the pressure chamber means, and a control subjected to external conditions to throttle said fixed connecting means, and thereby to increase the pressure conditions in the pressure chamber means to values above the conditions between the valves, and to move the modulating valve to reduce flow through the inlet valve seat.

13. In a mechanism of the kind described, a valve having an inlet and an outlet, walls providing a valve chamber, an inlet seat and an outlet seat in said valve chamber, valve means including a cut-off valve adapted to cooperate with the outlet valve seat to cut off or admit flow therethrough, and a modulating valve adapted to cooperate with the inlet valve seat to control flow therethrough, a pressure chamber means, movable means adapted to be moved by changes in pressure conditions in the pressure chamber means, biasing means adapted to urge the movable means to close the cut-off valve in opposition to pressure conditions in the pressure chamber means, means to render the biasing means ineffective to close the cut-off valve, a connection between the pressure chamber means and the inlet side of the valve to admit line pressure to said pressure chamber means, fixed connecting means between the valve chamber and the pressure chamber means, and a control subjected to external conditions to throttle said fixed connecting means, and thereby to increase the pressure conditions in the pressure chamber means to values above the conditions between the valves, and to move the modulating valve to reduce flow through the inlet valve seat, and means limiting the movement of the modulating valve toward its seat to provide a minimum flow through said seat.

EDWIN A. JONES.